(12) United States Patent
Iyer et al.

(10) Patent No.: US 7,876,894 B2
(45) Date of Patent: Jan. 25, 2011

(54) METHOD AND SYSTEM TO PROVIDE SECURITY IMPLEMENTATION FOR STORAGE DEVICES

(75) Inventors: Sree Mambakkam Iyer, San Jose, CA (US); Larry Lawson Jones, Palo Alto, CA (US); Arockiyaswamy Venkidu, Menlo Park, CA (US); Santosh Kumar, Santa Clara, CA (US)

(73) Assignee: MCM Portfolio LLC, Cupertino, CA (US)

( * ) Notice: Subject to any disclaimer, the term of this patent is extended or adjusted under 35 U.S.C. 154(b) by 1007 days.

(21) Appl. No.: 11/559,749

(22) Filed: Nov. 14, 2006

(65) Prior Publication Data

US 2008/0114994 A1     May 15, 2008

(51) Int. Cl.
| | | |
|---|---|---|
| H04K 1/04 | (2006.01) | |
| H04K 1/06 | (2006.01) | |
| H04L 9/00 | (2006.01) | |
| H04N 7/167 | (2006.01) | |
| G06F 11/30 | (2006.01) | |
| G06F 12/14 | (2006.01) | |

(52) U.S. Cl. .................. 380/37; 380/43; 380/201; 380/262; 713/193
(58) Field of Classification Search ............ 380/37, 380/43, 201, 262; 713/193
See application file for complete search history.

(56) References Cited

U.S. PATENT DOCUMENTS

| | | | |
|---|---|---|---|
| 3,922,649 A | 11/1975 | Thome | |
| 5,012,514 A | 4/1991 | Renton | |
| 5,058,161 A | 10/1991 | Weiss | |
| 5,266,783 A | 11/1993 | McAllister | |
| 5,291,399 A | 3/1994 | Chaco | |

(Continued)

FOREIGN PATENT DOCUMENTS

CN     1294457     5/2001

(Continued)

OTHER PUBLICATIONS

PCT/US06/04965—International Search Report (mailed Aug. 14, 2007).

(Continued)

Primary Examiner—Kambiz Zand
Assistant Examiner—Benjamin A Kaplan
(74) Attorney, Agent, or Firm—Edward P. Heller, III

(57) ABSTRACT

In one embodiment, method that can be performed on a system, is provided to security implementations for storage devices. In one embodiment, the method comprises providing a separate encryption seed for each of a plurality of separate addressable blocks of a non-volatile storage device, wherein a common encryption method is to encrypt data to be stored on the plurality of separate addressable blocks. In one embodiment, the storage device is a portable storage device. In one embodiment, encryption seed is an Initialization Vector (IV). In one embodiment, the encryption seeds comprise at least one of a media serial number and a logical block address corresponding to the respective block of the non-volatile storage device. In an alternative embodiment, the method further comprises storing at least a part of the separate encryption seed of the separate blocks of the non-volatile storage device within the respective blocks of the storage device.

13 Claims, 6 Drawing Sheets

100

| IVBlock offset | Description | Size |
|---|---|---|
| 0..3 | Random number | 4 Bytes |
| 4..7 | Logical Block Address | 4 Bytes |
| 8..15 | Media serial number | 8 Bytes |

U.S. PATENT DOCUMENTS

| | | | |
|---|---|---|---|
| 5,296,692 | A | 3/1994 | Shino |
| 5,325,323 | A | 6/1994 | Nizaka |
| 5,394,206 | A | 2/1995 | Cocca |
| 5,451,763 | A | 9/1995 | Pickett et al. |
| 5,461,390 | A | 10/1995 | Hoshen |
| 5,576,698 | A | 11/1996 | Card et al. |
| 5,589,719 | A | 12/1996 | Fiset |
| 5,623,637 | A | 4/1997 | Jones et al. |
| 5,640,541 | A | 6/1997 | Bartram et al. |
| 5,729,204 | A | 3/1998 | Fackler et al. |
| 5,786,769 | A | 7/1998 | Coteus et al. |
| 5,815,426 | A | 9/1998 | Jigour et al. |
| 5,828,905 | A | 10/1998 | Rao |
| 5,877,975 | A | 3/1999 | Jigour et al. |
| 5,905,888 | A | 5/1999 | Jones et al. |
| D416,541 | S | 11/1999 | Hirai et al. |
| 5,995,376 | A | 11/1999 | Schultz et al. |
| 6,006,295 | A | 12/1999 | Jones et al. |
| 6,023,506 | A | 2/2000 | Ote et al. |
| 6,026,007 | A | 2/2000 | Jigour et al. |
| 6,028,812 | A | 2/2000 | Tanaka |
| 6,075,706 | A | 6/2000 | Learmonth et al. |
| 6,085,976 | A | 7/2000 | Sehr |
| 6,154,790 | A | 11/2000 | Pruett et al. |
| 6,181,253 | B1 | 1/2001 | Eschenbach et al. |
| 6,209,060 | B1 | 3/2001 | Machida |
| 6,264,506 | B1 | 7/2001 | Yasufuku et al. |
| 6,288,645 | B1 | 9/2001 | McCall et al. |
| 6,324,537 | B1 | 11/2001 | Moran |
| 6,353,776 | B1 | 3/2002 | Rohrl et al. |
| 6,353,870 | B1 | 3/2002 | Mills et al. |
| 6,438,638 | B1 | 8/2002 | Jones et al. |
| 6,546,517 | B1 | 4/2003 | Yoshimura |
| 6,557,754 | B2 | 5/2003 | Gray et al. |
| 6,618,788 | B1 | 9/2003 | Jacobs |
| 6,671,808 | B1 | 12/2003 | Abbott et al. |
| 6,779,121 | B1 | 8/2004 | Uchida et al. |
| 6,851,007 | B1 | 2/2005 | Whitt et al. |
| 6,930,709 | B1 | 8/2005 | Creamer et al. |
| 7,055,039 | B2 | 5/2006 | Chavanne et al. |
| 7,058,749 | B2 | 6/2006 | Loffink |
| 7,062,652 | B2 | 6/2006 | Hirota et al. |
| 7,127,068 | B2 | 10/2006 | Sundaravel et al. |
| 7,206,989 | B2 | 4/2007 | Beckett et al. |
| 7,243,347 | B2 | 7/2007 | Palmer et al. |
| 7,251,722 | B2 | 7/2007 | Sikdar et al. |
| 7,278,016 | B1 | 10/2007 | Detrick et al. |
| 2001/0029489 | A1 | 10/2001 | Brookner et al. |
| 2001/0034795 | A1 | 10/2001 | Moulton et al. |
| 2001/0037294 | A1 | 11/2001 | Freishtat et al. |
| 2001/0056539 | A1 | 12/2001 | Pavlin et al. |
| 2002/0133702 | A1 | 9/2002 | Stevens |
| 2002/0136214 | A1 | 9/2002 | Do et al. |
| 2002/0194528 | A1 | 12/2002 | Hart |
| 2003/0070083 | A1 | 4/2003 | Nessler |
| 2003/0095664 | A1 | 5/2003 | Asano et al. |
| 2003/0169878 | A1* | 9/2003 | Miles ............... 380/201 |
| 2003/0172295 | A1 | 9/2003 | Jones et al. |
| 2004/0148460 | A1 | 7/2004 | Steinmetz et al. |
| 2004/0151040 | A1 | 8/2004 | Minami |
| 2004/0172538 | A1 | 9/2004 | Satoh et al. |
| 2004/0202322 | A1* | 10/2004 | Chavanne et al. ......... 380/43 |
| 2005/0060586 | A1 | 3/2005 | Burger et al. |
| 2006/0041934 | A1 | 2/2006 | Hetzler |
| 2006/0053308 | A1* | 3/2006 | Zimmerman ............ 713/193 |
| 2006/0095647 | A1 | 5/2006 | Battaglia et al. |
| 2006/0156396 | A1* | 7/2006 | Hochfield et al. ......... 726/20 |
| 2006/0159266 | A1* | 7/2006 | Chavanne et al. ......... 380/262 |
| 2006/0195657 | A1 | 8/2006 | Tien et al. |
| 2006/0242431 | A1* | 10/2006 | LeCrone et al. ......... 713/193 |
| 2006/0242696 | A1 | 10/2006 | Cruzado |
| 2006/0272027 | A1 | 11/2006 | Noble et al. |
| 2007/0050538 | A1 | 3/2007 | Northcutt et al. |
| 2007/0162626 | A1 | 7/2007 | Iyer et al. |
| 2007/0300287 | A1 | 12/2007 | Wynne et al. |
| 2008/0181406 | A1 | 7/2008 | Iyer et al. |
| 2008/0184035 | A1 | 7/2008 | Iyer et al. |
| 2008/0288703 | A1 | 11/2008 | Iyer |
| 2008/0288782 | A1 | 11/2008 | Iyer et al. |
| 2009/0046858 | A1 | 2/2009 | Iyer et al. |
| 2009/0077284 | A1 | 3/2009 | Iyer et al. |

FOREIGN PATENT DOCUMENTS

| | | |
|---|---|---|
| EP | 0471538 | 2/1992 |
| GB | 2431253 A | 4/2007 |
| JP | 53102307 A | 9/1978 |
| JP | 09204330 | 8/1997 |
| JP | 200520105 | 1/2005 |
| KR | 20010073358 | 8/2001 |
| WO | 0042491 | 7/2000 |
| WO | 0055736 A | 9/2000 |
| WO | 0161692 | 8/2001 |
| WO | 03034425 A1 | 4/2003 |
| WO | 2007055925 | 5/2007 |

OTHER PUBLICATIONS

PCT/US06/04965—Written Opinion (mailed Aug. 10, 2007).

PCT/US06/04965—International Preliminary Report on Patentability Chapter 1 (mailed Aug. 14, 2008).

PCT/US07/84446—International Search Report (mailed Jun. 4, 2008).

PCT/US07/84446—Written Opinion (mailed Jun. 4, 2008).

International Application No. PCT/US2006/041856, International Preliminary Report on Patentability, May 6, 2008.

International Application No. PCT/US2006/041856, International Search Report, Oct. 12, 2007.

International Application No. PCT/US2006/041856, Written Opinion, Oct. 12, 2007.

USPTO Transaction History of related U.S. Appl. No. 09/683,919, filed Mar. 1, 2002, entitled "Device and System for Allowing Secure Identification of an Individual When Accessing Information and a Method of Use."

USPTO Transaction History of related U.S. Appl. No. 11/478,895, filed Jun. 30, 2006, entitled "System and Method for Enhancing External Storage."

USPTO Transaction History of related U.S. Appl. No. 11/668,892, filed Jan. 30, 2007, entitled "System and Method of Storage Device Data Encryption and Data Access."

USPTO Transaction History of related U.S. Appl. No. 11/669,092, filed Jan. 30, 2007, entitled "System and Method of Storage Device Data Encryption and Data Access via a Hardware Key."

USPTO Transaction History of related U.S. Appl. No. 11/689,467, filed Mar. 21, 2007, entitled "System and Method of Data Encryption and Data Access of a Set of Storage Devices via a Hardware Key."

USPTO Transaction History of related U.S. Appl. No. 11/782,613, filed Jul. 24, 2007, entitled "Method and Apparatus of Providing Power to an External Attachment Device via a Computing Device."

USPTO Transaction History of related U.S. Appl. No. 11/782,618, filed Jul. 24, 2007, entitled "Method and Apparatus of Providing Security to an External Attachment Device."

USPTO Transaction History of related U.S. Appl. No. 12/277,190, filed Nov. 24, 2008, entitled "System and Method for Enhancing External Storage."

APT Technologies, Inc. et al, "Serial ATA: High Speed Serialized AT Attachment," version 1.0a, located at http://www.storusint.com/pdf/storage_protocols/sata/serialata10a.pdf, pp. 21-51, Jan. 7, 2003.

International Application No. PCT/US2008/051821, Written Opinion and International Search Report, Jun. 26, 2008.

International Application No. PCT/US2008/052100, Written Opinion and International Search Report, May 29, 2008.

International Application No. PCT/US2008/052107, Written Opinion and International Search Report, Jun. 26, 2008.

International Application No. PCT/US2008/063421, Written Opinion and International Search Report, Oct. 29, 2008.

International Application No. PCT/US2008/063428, Written Opinion and International Search Report, Oct. 27, 2008.

Silicon Image, Inc., "External Serial ATA," white paper, located at http://www.sci-worx.com/docs/Sil-WP-006-A.pdf, Sep. 2004.

USPTO Transaction History of U.S. Appl. No. 09/683,919, filed Mar. 1, 2002, entitled "Device and System for Allowing Secure Identification of an Individual When Accessing Information and a Method of Use."

USPTO Transaction History of U.S. Appl. No. 11/478,895, filed Jun. 30, 2006, entitled "System and Method for Enhancing External Storage."

USPTO Transaction History of U.S. Appl. No. 11/668,892, filed Jan. 30, 2007, entitled "System and Method of Storage Device Data Encryption and Data Access."

USPTO Transaction History of U.S. Appl. No. 11/669,092, filed Jan. 30, 2007, entitled "System and Method of Storage Device Data Encryption and Data Access via a Hardware Key."

USPTO Transaction History of U.S. Appl. No. 11/689,467, filed Mar. 21, 2007, entitled "System and Method of Data Encryption and Data Access of a Set of Storage Devices via a Hardware Key."

USPTO Transaction History of U.S. Appl. No. 11/782,613, filed Jul. 24, 2007, entitled "Method and Apparatus of Providing Power to an External Attachment Device via a Computing Device."

USPTO Transaction History of U.S. Appl. No. 11/782,618, filed Jul. 24, 2007, entitled "Method and Apparatus of Providing Security to an External Attachment Device."

* cited by examiner

METHOD AND SYSTEM TO PROVIDE SECURITY IMPLEMENTATION FOR STORAGE DEVICES

FIELD OF INVENTION

This invention relates to security in portable digital devices such as flash memory cards or rotating magnetic disks.

BACKGROUND OF THE INVENTION

Portable digital storage devices are becoming increasing popular. These devices include solid-state storage such as flash memories and traditional hard disks. This popularity extends to the leading flash media, such as CompactFlash, Secure Digital Card, Memory Stick PRO, MultiMediaCard, Flash Drives, and their electrical variants. These devices can easily store gigabytes of data, weigh a few ounces, and be no bigger than a credit card. The problem with these devices is they are easily lost. Many people today carry large amounts of vital data on devices, which they keep in their pockets. It is very important that this data be encrypted to ensure that only the owner can read it.

There are many encryption schemes, but the Advanced Encryption Standard (AES) is quickly being adopted as the industry standard.

What is clearly needed is a system and a method to use the AES, or comparable encryption schemes, to secure the data on portable digital storage devices, with minimal impact on the speed of reading and writing to and from the device, and with minimal additional hardware expense.

SUMMARY

In one embodiment, method that can be performed on a system, is provided to security implementations for storage devices. In one embodiment, the method comprises providing a separate encryption seed for each of a plurality of separate addressable blocks of a non-volatile storage device, wherein a common encryption method is to encrypt data to be stored on the plurality of separate addressable blocks. In one embodiment, the storage device is a portable storage device. In one embodiment, encryption seed is an Initialization Vector (IV). In one embodiment, the encryption seeds comprise at least one of a media serial number and a logical block address corresponding to the respective block of the non-volatile storage device. In an alternative embodiment, the method further comprises storing at least a part of the separate encryption seed of the separate blocks of the non-volatile storage device within the respective blocks of the storage device.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

IV Generation

In one embodiment, the AES specifies several feedback modes for improved encryption of data. Three of these modes, cipher feedback (CFB) mode, cipher block chaining (CBC) mode, and output feedback (OFB) mode, perform an exclusive OR (XOR) operation on the data with an initialization vector (IV). The IV need not be a secret but for CBC and CFB it is to be unpredictable. The IV or seed to generate a IV should be a random number (as used herein IV and seed are used interchangeably).

In one embodiment, the IV or seed used to generate the IV is stored with the block of data, which the IV was used to encrypt. The IV or seed can then be used to decrypt the respective block of data. In one embodiment, the IV is 128 bits of data, or 16 byes of data. Alternatively, the IV can be generated from a smaller random number as long as the IV is not repeated in the encryption process. For optimum performance, it is desirable that the IV be unique for every 512 bytes (referred to here forth as the data block) of data, since storage used in almost all devices (personal computers, consumer devices, cell phones, etc.) use 512 bytes as their sector size. This does not preclude using larger data blocks such as 1024 or 2048 bytes.

Flash memories are divided into blocks (this block is different from an data block, discussed previously). The block in flash memory refers to the smallest amount of memory that can be erased at a time so it can be re-written. For example, a typical block might consist of 256 pages. To write to the block, it must first be erased and then written. If a block develops too many errors the data can be moved to a new block and the block marked as bad. No matter where the block is located on the flash, it always retains a logical number. In one embodiment, the logical number is used, at least in part, to generate part of the IV for the respective block. As a result, there is a decreased likelihood of a repeating the IV.

Figure 1:
FIG. 1 presents an exemplary IV block, in accordance with one embodiment.

FIG. 1 shows an exemplary 16-byte IV block 100 (128 bits). However in the extra data area of NAND flash, there is room for only 4 bytes (or 32 bits). Therefore from this 32-bit random number, a 128-bit IV block with randomness is generated. In one embodiment, the random number of 32 bits can have appended to it the logical block address and/or the unique serial number of the storage unit.

In the case of when the media does not have a place to store the IV with the data (e.g., hard disk drive), the IV is the logical block number, with or without the serial number of the storage unit. Furthermore, depending on the size of the IV, an additional constant could be also be used in addition to the logical block number, with or without the serial number of the storage unit. Alternative combinations could be used to generate the IV.

Random Number Generation

A key to the encryption method of the current invention is generating a random number. One way to generate a random number is to have a register inside an integrated circuit that is not reset when power is turned on. As a result, the register has an unpredictable initial seed value after it is turned on, due to the fact that while some controllers have a synchronous design, meaning most of the circuitry gets initialized or preset to the same value at power-up, a register or hash generator logic can be deliberately designed such that it does not have a preset value at power up. It comes up in an unpredictable state and can be a source of randomness.

This register can have as its input a block of hash logic such as a CRC generator or AES encryptor. This block of logic would have as its input the outputs of the register and a number based on some internal event, such as, for example a counter and an external event such as the USB frame number. The USB frame number is a pseudo-random number generated by a USB host. This number is periodically updated. One problem is that the event could be predictable. However, if the integrated circuit is connected to a host computer via a port that is not synchronous to the integrated circuit's clock, then the host port can be used to generate a number that is asynchronous to the internally generated number. If these two numbers generated by the internal and external event are fed into the logic block, then a truly random number is generated.

Figure 2:
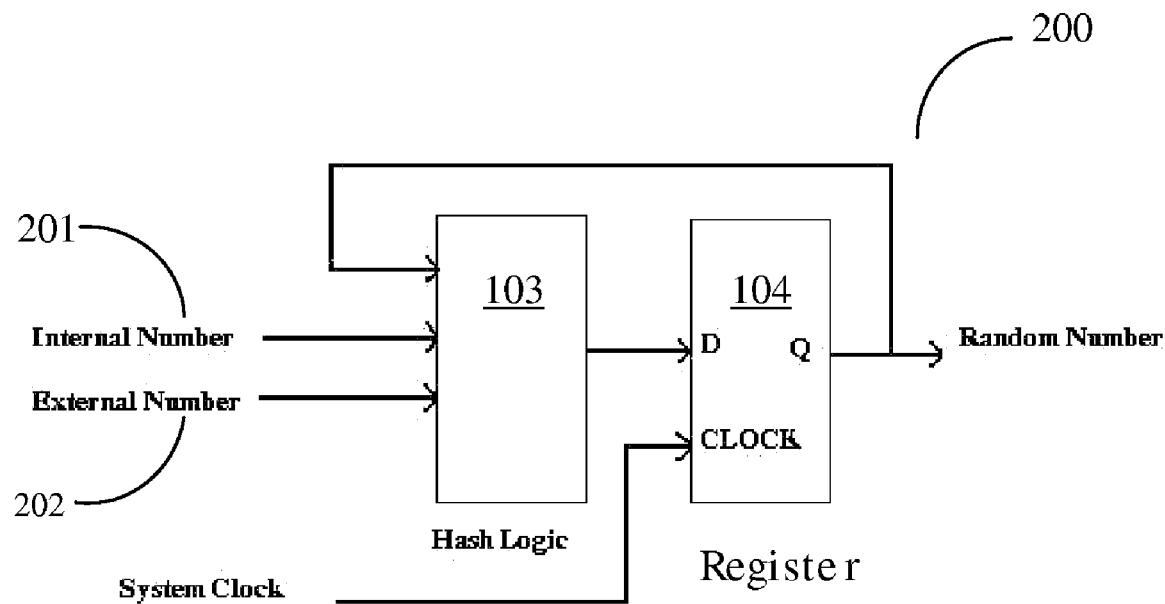
FIG. 2 presents a simplified block diagram of an asynchronous random generator, in accordance with one embodiment.

FIG. 2 shows a simplified block diagram of such an asynchronous random generator 200, using both an internal random number start value 201 and an external random number start value 202 to feed into its hash logic 203 and the usual sync register 204, providing feedback into the hash logic. The logic of the block diagram in FIG. 2 could be implemented as software or firmware, as well.

IV Storage

Figure 3:
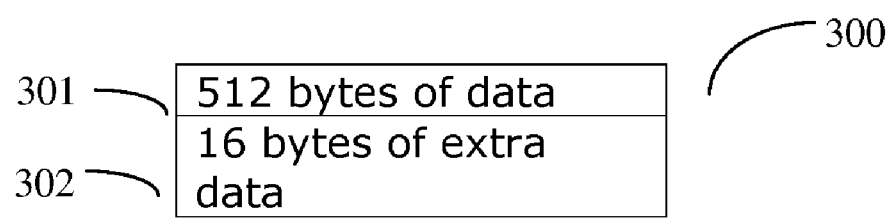
FIG. 3 shows an an exemplary memory page.

FIG. 3 shows an exemplary memory page 300 (such as a flash memory page), with 528 bytes of data 301 or it's multiple. In one embodiment, the page size is designed with the idea of storing 512 bytes of data and 16 bytes of extra data 302. Typical page sizes are 528, 2112, 4224, etc.

Figure 4:
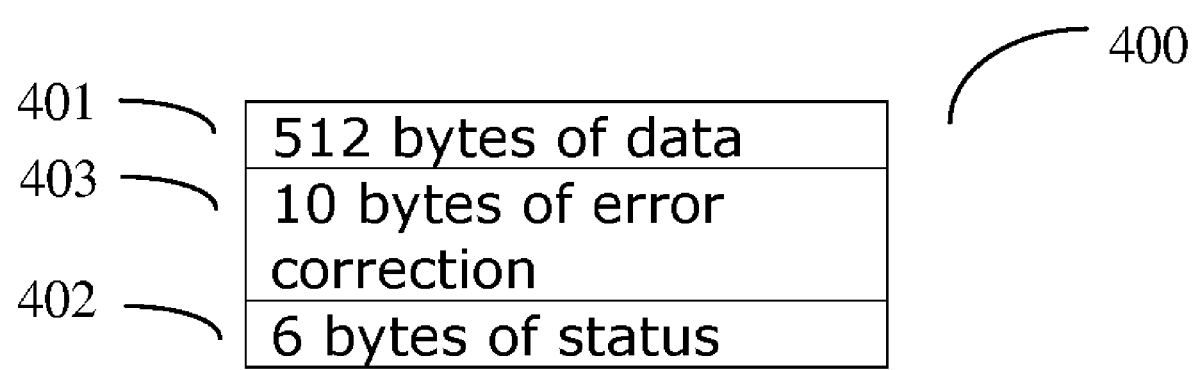
FIG. 4 shows an exemplary memory page with part of the extra data used for error correction data.

FIG. 4 shows an exemplary memory page 400 with part of the extra data used for error correction data 403, as is typical, because flash memories are susceptible to random errors. The remaining extra data 402 is used for status.

Figure 5:
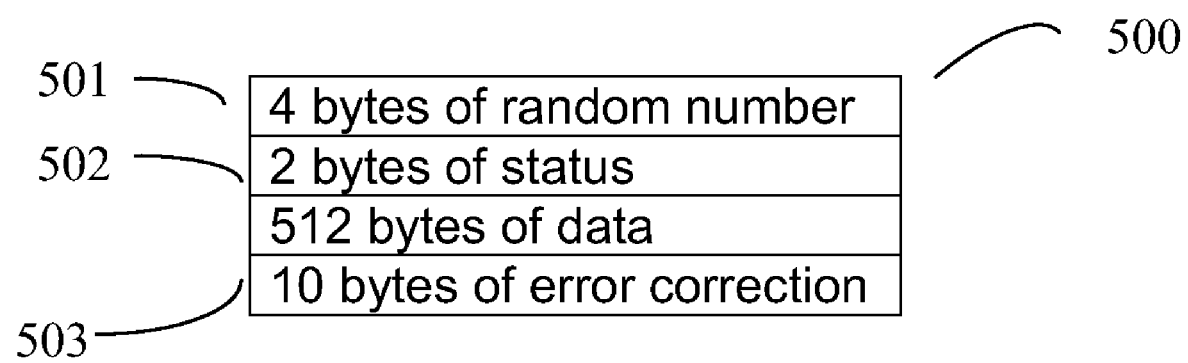
FIG. 5 shows an exemplary 512-byte page that is to be encrypted, in accordance with one embodiment.

FIG. 5 shows an exemplary 512-byte page 500 that is to be encrypted. In such a case, it is desirable to store the IV 504 used in encryption in the page for fast access for use in decrypting the data and have only two status bytes 402.

Four bytes (32 bits) of IV data would provide 4,294,967,296 ($2^{32}$) different IV values; however the odds of two IVs being the same would be the square root of this number ($2^{16}$) or 65,536. If this scheme is implemented for a flash memory and a random number were used for every sector (512 bytes), then the random number could repeat itself after 32 MB of data are transferred (512*65,536=32 MB). Because flash memories can hold gigabytes of data, it is easily seen that a larger random number can be used to reduce the chance of repeating the random number.

In one embodiment, an IV is be placed at the beginning of a data block, as shown in FIG. 5, because if a data block of 512 bytes is encrypted using a random number, reading this random number first enables the controller to have the random number ahead of the data the controller needs to decrypt. If the number were, for example, placed at the end of data, then the controller would have to read the entire 512 bytes to get to the random number that has encrypted the 512 bytes and then start the decryption. This approach would waste precious cycles during the decryption process.

Figure 6:
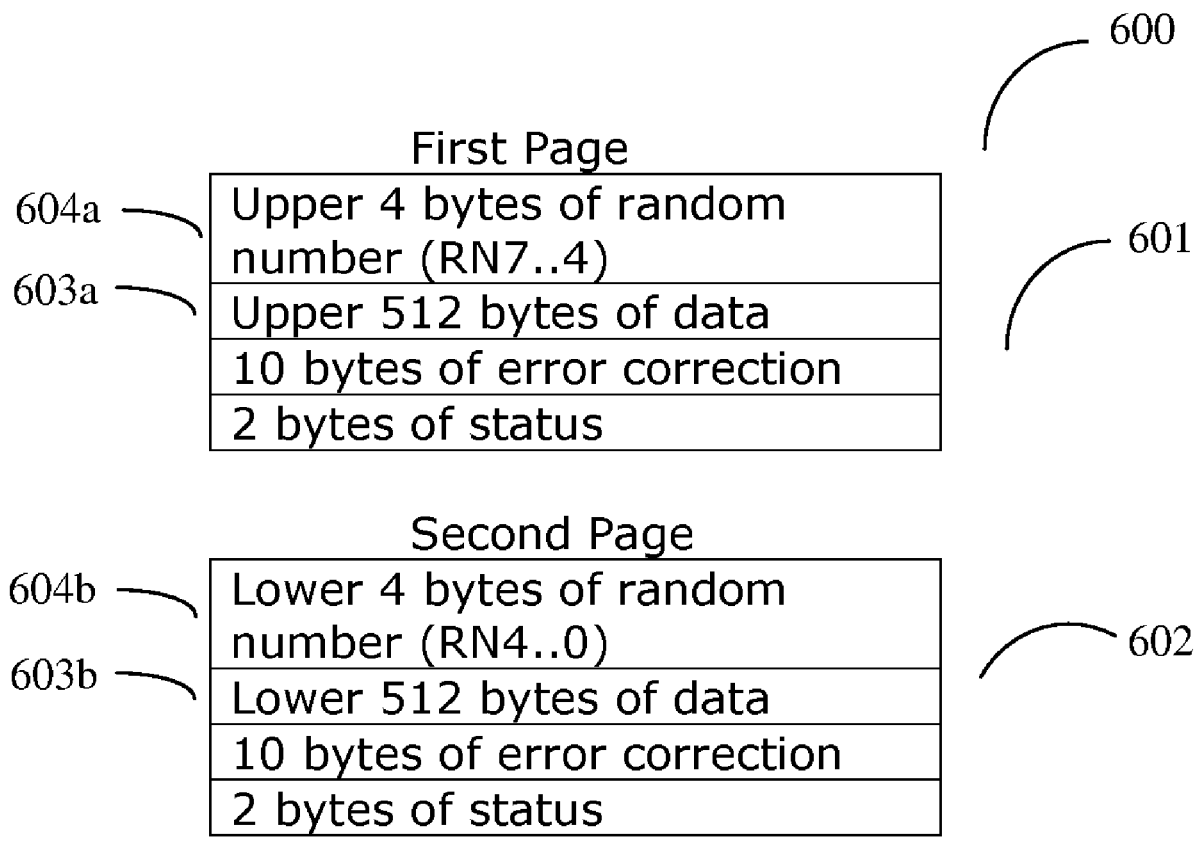
FIG. 6 shows a 1024-byte data block, divided in two sectors, in accordance with one embodiment.

FIG. 6 shows a 1024-byte data block 600, divided in two sectors 601 and 602. One way to increase the randomness of the IV is to make the data block size 1024 bytes, or two sectors. The 512 bytes of data 603a and 603b are still preserved as the least accessible chunk of data. A IV of 8 bytes 604a and 604b (64-bits) can generate $2^{64}$, or 18,446,744,073,709,551,616, unique numbers. The square root of this number ($2^{32}$) would be 4,294,967,296, meaning the same number would repeat itself after 4,294,967,296 iterations. Since a data block encompasses 1 KB (1024 bytes is 1 kilobyte), we can have 4,294,967,296 KB of addressing space (1 KB×4,294,967,296) or 4.2 terabytes before it is repeated.

In some cases, other portioning may be used. So, for example, in some cases the whole IV key could be kept in the first sector, and all error correction in the second. The advantage in this case is that decoding can begin immediately, but the drawback is that the some of it may need to be reworked, once an error has been found (when the second sector is read). In yet other cases, the error correction may be located up front. That could slow down the writing process (requiring effectively a double write), but would allow immediate decoding without error. In cases where reads outnumber writes by a large ratio, it still may be an interesting choice. In some instances, a record may be kept of read-to-write ratio, and once a threshold is exceeded, the memory may be dynamically reconfigured.

Look Ahead Error Correction

Flash memories have reliability problems: individual bits may go bad from time to time. If the data is encrypted, an error can cause the data to be incapable of being decrypted. If it is not encrypted it can cause the data to be incorrect. It is common to have an error-correction scheme to correct failing bits. These correction schemes can correct one or more errors. The error correction scheme in one embodiment can detect up to 5-byte errors and correct up to 4-byte errors in a 512 byte space.

In some cases, based on a trend (increasing number of bad spots in a sector), a sector or block may be permanently mapped out (i.e., move the data to a new block), hence preventing or minimizing disastrous data loss. The information on the correctable errors is stored in the extra area where 10 bytes store the ECC values for the 512 byte data, as shown in FIG. 4. The controller puts down the correct ECC value while writing to the flash media and compares original ECC value with the ECC value while reading back the data.

As a result, the controller can determine if the error occurred in the data block and correct it using the ECC data. In addition, the controller can flag an imminent bad block when it corrects 4-byte errors so the controller can undertake a corrective action of mapping this data into a new good area.

In one embodiment, the controller keeps track of available good blocks that can be used to map out (i.e., move the data to a new block) an about-to-go-bad block. For instance, if the host requests to read 128 sectors and sectors 3, 19, 38 were found to have been corrected with 4-byte errors, the controller would keeps these about-to-go-bad sectors in a FIFO while transferring the entire 128 sectors of data to the host. After the data transfer is complete, the firmware would read this FIFO to find out that several sectors have data errors in this block indicating that it is about to go bad. The firmware would then take the corrective action of moving the entire block of sectors to a new, good block. Once the moving is complete, it would then mark the current block as bad, thereby averting data loss. In general a correction scheme capable of correcting N errors would be used to indicate when to move a block when there were N or possibly less than N errors.

Boot Code Encryption/Authentication

Flash memory storage devices often contain so-called boot firmware. This is firmware that is loaded from the flash memory by the flash controller integrated circuit when power is applied. This boot firmware is usually written at the time the device is manufactured; however patches to this firmware may be written at any time during the life of the device. It is desirable that this boot data be encrypted so that the processor can validate that this code is authentic, and is not rogue firmware intended to break the encryption.

In some cases, this method may also be applied to the host boot section in the CD area described below. This approach may prevent viruses from taking over the host boot section.

If the device has been assigned a key as defined in the AES standard, this key can be used to encrypt and decrypt the boot data. Often the device may be sold without a key and only later is the key assigned. The reason for this late key assignment is so the user could keep his password a part of the master key, essentially making the key unique. But at the time of manufacture, a master key is needed to ensure that the boot code can be validated. A unique key can be generated for each device at the time of manufacture for use only by the boot firmware. A unique key can be stored on the controller at manufacture time if the controller has one-time program memory (OTP). OTP is similar to write once memory, and after this one write, it cannot be modified.

Another approach to changing the key is to store the master key in the flash memory, but change the key every time the device is turned on, using this method according to one embodiment of the present invention:

1. With the current key, decrypt the boot code and load the clear data into the RAM.
2. Generate a new master key, using a method described later in this disclosure, and then erase the current boot block and write a new encrypted boot code using the new master key and write this new boot block into the storage media. A boot block can be located almost anywhere in the media.

Example Implementation

The product would be shipped as CD+Public, meaning the storage device, when connected to a PC, would provide a CD icon and a storage icon in the My Computer window, by pretending to the operating system of the host to be or to contain a CD drive. In the CD portion, there would be an application resident to make the device "Secured". When launched, the program prompts the user for a password and then encrypts the secure partition with the master key and IV, as described above.

One method to generate a 32-bit random number in a USB storage system is to use the USB frame number (a random number that is generated by the USB host, such as a PC, every millisecond) and an internal counter in the controller that is incremented every system clock and that has a random starting value that cannot be predicted, as previously discussed in the description of FIG. 1.

Figure 7:
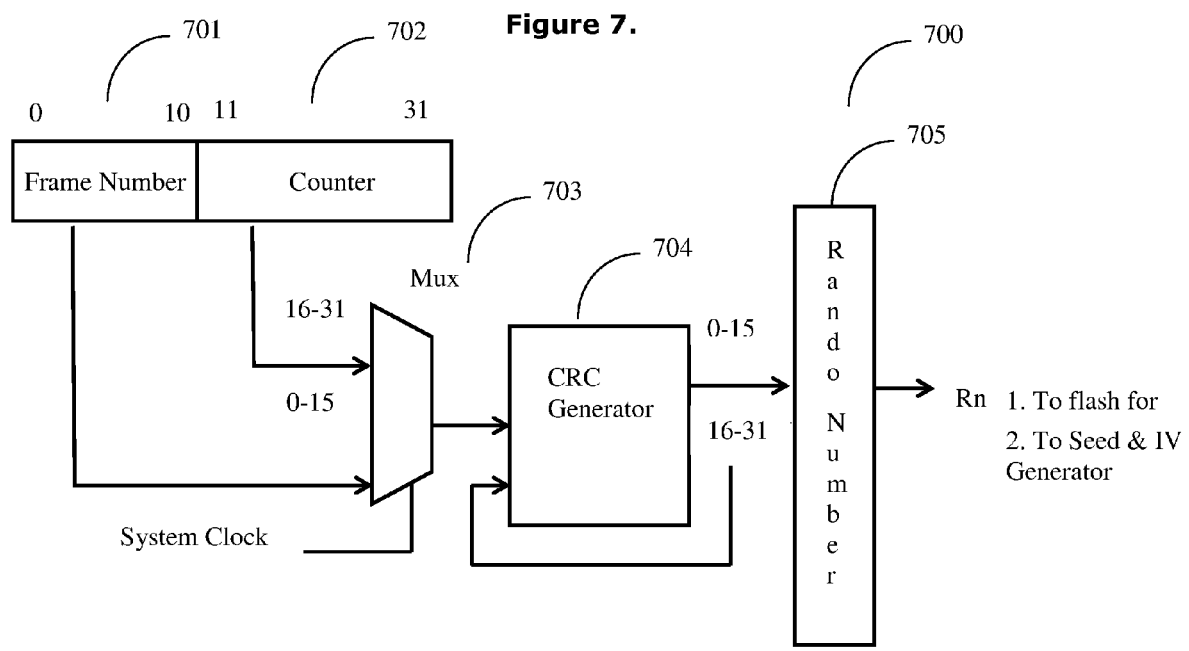
FIG. 7 shows a block diagram of an exemplary asynchronous random generator, in accordance with one embodiment.

FIG. 7 shows a block diagram of such an exemplary asynchronous random generator 700, using both a frame number 701 and internal counter 702 to feed into its multiplexer (mux) 703, and the usual sync register and feedback into the hash logic, here shown as an exemplary CRC generator 704, generating the random number 705. It is clear that it can be implemented in software, hardware or any combination thereof. Further, in some cases, the CRC generator 704 is not reset at power on and therefore has an undetermined value at every processor power-up.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

What is claimed is:

1. A method comprising:
for each addressable block of a storage device into which encrypted data is stored, generating a multi-byte random number unique to that block from a random number generator, the random number generator comprising a hardware register whose value is unpredictable on power up;
generating an initialization vector from the random number, the initialization vector being completely independent of the data;
encrypting data to be stored in a block employing the initialization vector as at least a portion of an encryption key;
storing the random number in the block; and
storing the encrypted data into the block;
wherein the initialization vector depends on a random number stored with the data and is not dependent upon the data.

2. The method of claim 1, further comprising generating the initialization vector by combining the random number with the address of the block.

3. The method of claim 2, wherein generating the initialization vector further comprises combining with the random number and the address of the block a serial number of the storage device.

4. The method of claim 2, wherein the address of the block comprises a logical block address.

5. Article of manufacture, comprising storage device media encrypted according to the method of claim 1.

6. A method of decrypting data encrypted according to the method of claim 1, comprising:
reading the random number stored in a block; and
generating an initialization vector for decoding the data in the block from the random number read from the block.

7. The method according to claim 6, wherein the generating step comprising concatenating the address of the block with the read random number.

8. The method according to claim 6, wherein the generating step comprising concatenating with the read random number the address of the block and a media serial number of the storage device.

9. The method of claim 1, wherein the storing of the random number in a block further comprises storing the random number within at least a first addressable bytes of the respective blocks of the storage device.

10. The method of claim 1, wherein at least one or more of the blocks are one of 528 bytes or a multiple of 528 bytes.

11. A machine readable-medium having stored thereon a set of instructions, which when executed perform a method according to claim 1.

12. A method comprising:
for each set of consecutively addressable blocks of a storage device into which encrypted data is stored, a set comprising two or more consecutively addressable blocks, generating a multi-byte random number unique to that set from a random number generator, the random number generator comprising a hardware register whose value is unpredictable on power up;
generating an initialization vector from the random number, the initialization vector being independent of the data;
encrypting data to be stored in a set employing the initialization vector as at least a portion of an encryption key;
storing the random number in the set; and
storing the encrypted data into the set.

13. Article of manufacture, comprising storage device media encrypted according to the method of claim 12.

* * * * *